Feb. 28, 1933.    G. J. THOMAS    1,899,599
METHOD OF MAKING A BRAKE MEMBER
Filed May 31, 1928    3 Sheets-Sheet 1
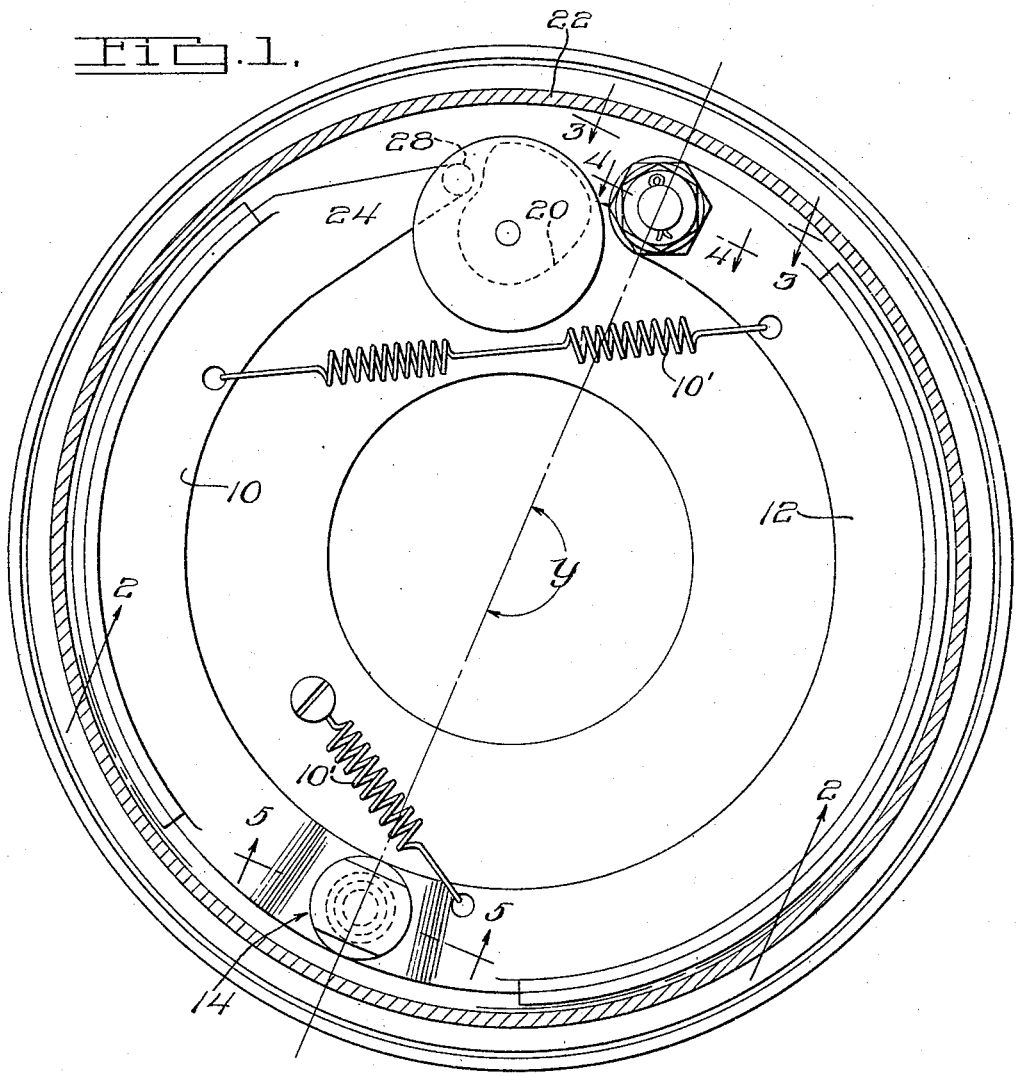
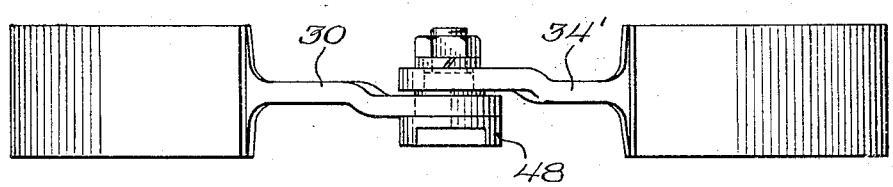
INVENTOR
George J. Thomas
BY
ATTORNEY Feb. 28, 1933.　　　G. J. THOMAS　　　1,899,599
METHOD OF MAKING A BRAKE MEMBER
Filed May 31, 1928　　3 Sheets-Sheet 2
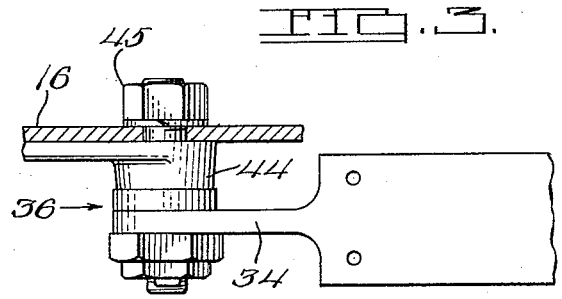
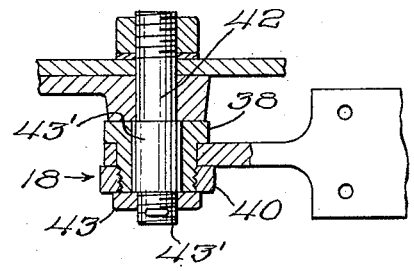
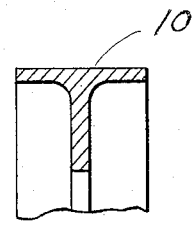
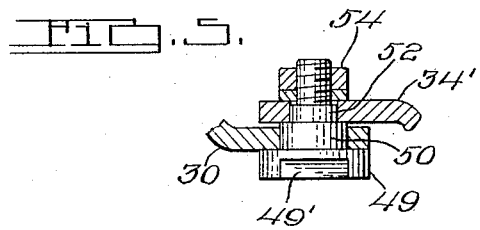
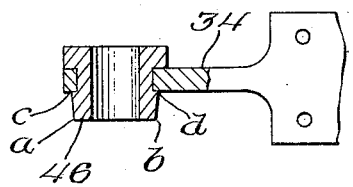
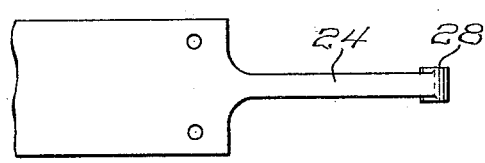
INVENTOR
George J. Thomas
BY
Jn. W. McConkey
ATTORNEY Feb. 28, 1933.   G. J. THOMAS   1,899,599
METHOD OF MAKING A BRAKE MEMBER
Filed May 31, 1928   3 Sheets-Sheet 3
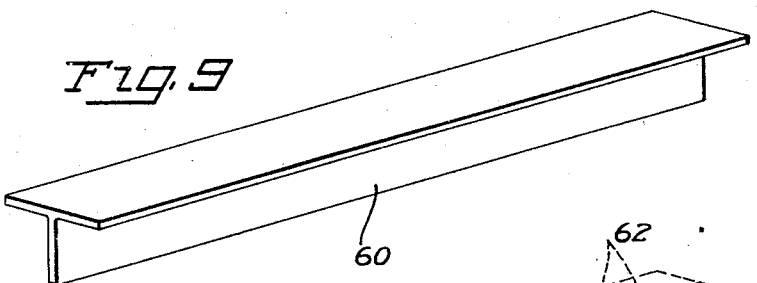
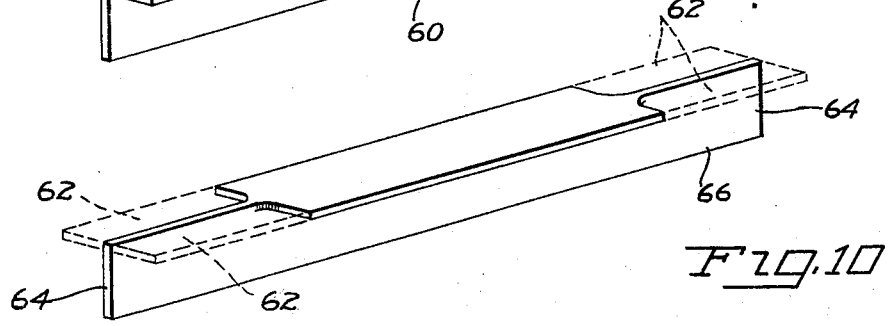
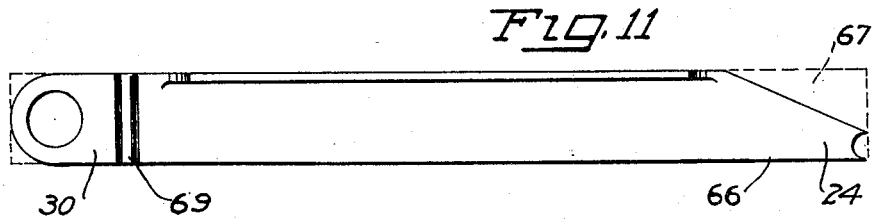
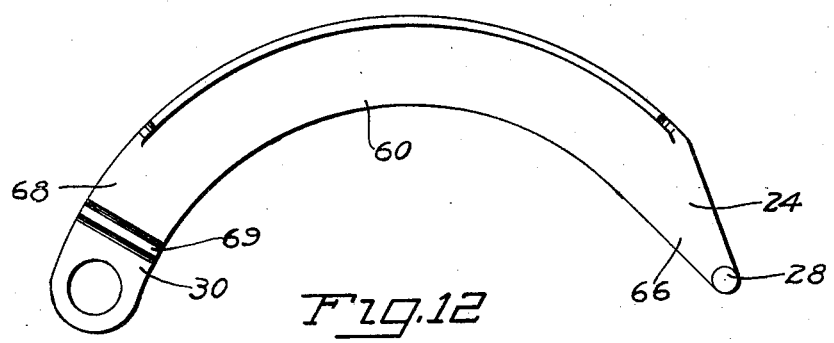
INVENTOR.
GEORGE J. THOMAS
BY McConkey & Smith
ATTORNEYS.

Patented Feb. 28, 1933

1,899,599

UNITED STATES PATENT OFFICE

GEORGE J. THOMAS, OF SOUTH BEND, INDIANA, ASSIGNOR TO BENDIX BRAKE COMPANY, OF SOUTH BEND, INDIANA, A CORPORATION OF ILLINOIS

METHOD OF MAKING A BRAKE MEMBER

Application filed May 31, 1928. Serial No. 281,661.

This invention relates to brakes, and is illustrated as embodied in an internal expanding automobile brake of the two shoe self energizing type. An object of the invention is to simplify the manufacture of brake shoes by a novel method of forming the same from straight lengths of standard T-shaped rolled or drawn steel stock, it being well known that structural steel which is rolled or drawn in a standard shape is produced at very low cost and with a high degree of accuracy.

A further object relates to the particular design of the shoe formed as indicated above, wherein a stiffening web extends between the edges of a cylindrical or rim part protruding at the shoe ends beyond said rim part and constituted at one end to form a novel cam-engaging surface.

Other desirable features of novelty include a novel articulated connection for two juxtaposed shoes, and a novel fixed pivot or anchor connection comprising a novel combination of anchor pin and bushing co-operating with the associated shoe and brake housing parts.

In one illustrated arrangement embodying the feature of novelty, I provide a brake of the servo type including shoes constructed according to my invention, i. e., of T stock suitably shaped from a straight length into the curved finished article. In the arrangement disclosed, the shoes are connected by my novel articulated joint preferably formed by passing a three diametered screw machine part through corresponding openings in the ends of the shoes; furthermore, at least one of the shoes is preferably anchored to the brake housing by my novel pin and bushing connection comprising a headed bushing passing through the pivot arm of the shoe in combination with a novel stud passing through the bushing, both bushing and stud secured to the arm by suitable nuts or by a staking or peening operation.

The above and other objects and features of the invention, including various combinations of parts and desirable particular constructions, will be apparent from the following description of illustrative embodiments shown in the accompanying drawings, in which:

Figure 1 is an elevation of an internal expanding brake of the self-energizing type constructed according to my invention;

Figure 2 is a partial elevation, looking in the direction of the arrows 2—2 of Figure 1, showing the articulated shoe connection;

Figure 3 is a view similar to Figure 2 looking in the direction of the arrows 3—3 of Figure 1, showing the novel anchor and associated parts;

Figure 4 is a fragmentary view indicating a section through the anchor taken on line 4—4 of Figure 1;

Figure 5 is a sectional view of the articulated joint taken on line 5—5 of Figure 1;

Figure 6 is a partial plan view indicating the cam-engaging end of the brake shoe;

Figure 7 is a section taken through one of the shoes disclosing the T formation of the same;

Figure 8 discloses a section through a modified form of bushing and shoe connection;

Figures 9, 10, 11, and 12 are illustrative of steps in the preferred method of manufacturing the shoe.

A preferred embodiment of the invention as illustrated in the drawings comprises primary and secondary shoes 10 and 12 constituting a so-called servo combination, connected at 14 by my novel pivot structure and preferably anchored to the conventional backing plate 16 by a novel connection 18. A cam 20 may be provided which in normal operation forces the primary shoe 10 into engagement with a brake drum 22 which in turn forces secondary shoe 12 into drum engagement. Return springs 10' function to return the shoes to an inactive position. Preferably the position of the joint 14 with respect to the fixed pivot or anchor 18 and designated by an angle "Y" should not be over 180° and preferably less in order to get the best results with brake shoes in a self-energizing arrangement.

A particularly salient feature of my invention involves the manner of constructing the shoes. I find it quite feasible and practical to shape the shoe in a suitable machine from a section of standard T shaped rolled or drawn steel as shown in Figure 9, said section to be cut as shown in Figures 10 and 11 from a straight length of said stock and curved to proper shape as shown in Figure 12. The physical qualities such as tensile strength of rolled or drawn steel are well known in the metallurgical art and are of peculiar value in a brake shoe.

With particular reference to the method of forming the primary shoe, I prefer first, to cut a suitable length of the T stock such as 60, secondly to cut away the rim portion thereof at its ends as at 62, leaving protruding web portions 64 and as a third and last operation form, on a suitable stamping press or by equivalent means, the shoe into substantially semi-circular form. In this last operation it is to be particularly noted however that I do not curve one end 66 of the shoe but leave the same straight. In my second operation, I furthermore taper, by cutting or otherwise as at 67, the straight end of the shoe just mentioned as is clearly indicated in Figure 1 and Figures 11 and 12 and slightly offset as at 69 the projecting web portion at the other end as at 68. The aforesaid operations produce the primary shoe 10 of Figure 1 embodying, as described, a novel cam engaging end part 28.

The secondary shoe or any brake shoe other than the primary shoe may be similarly formed, that is by cutting a suitable section from straight length T stock and subsequently bending the same to shape. The rim may or may not be cut enough to expose the web at the ends as desired.

As illustrated in Figures 1 and 6, said cam-engaging part constitutes in effect a tapered stem 24 and the other end likewise forms a stem 30. Stem part 24 is preferably recessed to house a cylindrically shaped hardened steel insert 28 and stem 30 may be slightly offset and provided with an opening to accommodate my novel articulating element to be described hereafter.

It is obvious, of course, that hardened material, such as manganese steel may be deposited on the end of the stem 24 as by an electric welding process, so that I do not wish to be limited to any specific manner of applying the cam-engaging thrust member.

An important phase of my invention has to do with a novel anchor structure for the shoes in which stem 34 of shoe 12, similar in all respects to stem 30 of shoe 10, is preferably provided with a novel bushing 36 passing through a hole in the end of the stem and having a shrink fit therewith. Bushing 36, of suitable bearing metal, is preferably beaded at 38 to contact with one side of the stem and may be locked in position by a nut 40 threaded or otherwise attached to the bushing and contacting with the other side of the stem. An anchor pin 42 may be passed through the bushing and attached thereto by a suitable nut 43 abutting against the end of the bushing. Pin 43' may be provided to retain nut 43 in place. Pin 42 is preferably shouldered at 43' to abut against a support member 44, said pin further passing through the same and backing plate 16, being secured to the latter by nut 45.

The modified arrangement of bushing attachment as disclosed in Figure 8 is similar to that disclosed in Figure 4 with the exception that the end 46 of the same is preferably peened or staked over at its end to abut against the stem 34. This arrangement obviates the nut 40 of Figure 4 and provides a more rigid structure. To make possible an assembly of this arrangement, maximum diameter $c$—$d$ of the staked portion is made as much greater than diameter $a$—$b$ as it is possible to use and still force the shoe stem 34' over the shoulder formed by $c$—$d$ under proper shrink temperature conditions.

A further feature relates to my novel pivotal joint 14 clearly disclosed in Figures 1 and 5. In this arrangement I preferably connect off-set stems 30 and 34' of shoes 10 and 12 respectively by a three diametered screw machine part 48 adapted to pass through correspondingly shaped holes in said stems. The part 49 may be the largest in diameter and may be provided with two flats 49' formed thereon for the purpose of receiving a wrench. Part 50 is smaller in diameter than part 49 and may be slightly wider than the stem 30 of shoe 10 through which it passes. Third part 52 passing through stem 34' is narrower than the thickness of the stem so that when the locking nut 54 is drawn up to secure the parts together, the stem 34' will be drawn against the part 50 to provide my novel articulated joint. It is obvious that by the arrangement disclosed stems 30 and 34' are pivoted and freely movable one with another.

From what has been said it will be seen that the brake shoes herein disclosed may be made in such a way and from such materials as will provide a very rigid brake, aided and abetted by my novel fixed and movable pivot structures as described and disclosed.

While certain illustrative embodiments of my invention have been described in detail, it is not my intention to limit its scope to those particular embodiments or otherwise than by the terms and scope of the appended claim.

Most of the subject-matter herein claimed is to be regarded as continued from my prior application No. 747,707, filed November 4, 1924.

I claim:

The herein described method of making a brake member which comprises cutting a suitable section from a straight length of T section rolled steel stock, cutting away the rim flange of said T section at the ends of the section to leave projecting web ends, tapering one projecting web end to form a cam follower, and bending said section into a substantially semi-circular shape at all points except at said cam follower, the underside of the web at said end remaining straight.

In testimony whereof, I have hereunto signed my name.

GEORGE J. THOMAS.